US012598027B2

(12) United States Patent
Lin et al.

(10) Patent No.: US 12,598,027 B2
(45) Date of Patent: Apr. 7, 2026

(54) COMMUNICATION METHOD AND APPARATUS

(71) Applicant: HUAWEI TECHNOLOGIES CO., LTD., Shenzhen (CN)

(72) Inventors: Meixin Lin, Hangzhou (CN); Xian Meng, Hangzhou (CN); Yunfei Qiao, Hangzhou (CN); Dali Qin, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 491 days.

(21) Appl. No.: 17/687,892

(22) Filed: Mar. 7, 2022

(65) Prior Publication Data

US 2022/0190965 A1 Jun. 16, 2022

Related U.S. Application Data

(63) Continuation of application No. PCT/CN2020/110388, filed on Aug. 21, 2020.

(30) Foreign Application Priority Data

Sep. 11, 2019 (CN) .......................... 201910858926.7

(51) Int. Cl.
| | |
|---|---|
| *H04L 1/1812* | (2023.01) |
| *H04L 1/00* | (2006.01) |
| *H04W 80/02* | (2009.01) |

(52) U.S. Cl.
CPC .......... *H04L 1/1812* (2013.01); *H04L 1/0026* (2013.01); *H04W 80/02* (2013.01)

(58) Field of Classification Search
CPC ... H04L 1/1812; H04L 1/0026; H04L 1/1825; H04L 1/1864; H04L 1/1896; H04L 1/1607; H04W 80/02
See application file for complete search history.

(56) References Cited

U.S. PATENT DOCUMENTS

| | | | |
|---|---|---|---|
| 2008/0165670 A1* | 7/2008 | Tao ........................ | H04L 5/0053 |
| | | | 370/203 |
| 2009/0141670 A1 | 6/2009 | Duncan Ho | |
| 2017/0230149 A1* | 8/2017 | Wang .................... | H04L 1/1819 |
| 2019/0090156 A1 | 3/2019 | Kim et al. | |

(Continued)

FOREIGN PATENT DOCUMENTS

| | | |
|---|---|---|
| CN | 102067479 A | 5/2011 |
| CN | 109495975 A | 3/2019 |

(Continued)

OTHER PUBLICATIONS

OPPO, "Left issues on MAC for NR-V2X", 3GPP TSG-RAN WG2 Meeting #106, R2-1905568, Reno, US, May 13-May 17, 2019, 6 pages.

(Continued)

*Primary Examiner* — Margaret G Webb
*Assistant Examiner* — Frank E Donado
(74) *Attorney, Agent, or Firm* — Maier & Maier, PLLC

(57) ABSTRACT

A media access control element (MAC CE) indicates a terminal device to enable or disable at least one hybrid automatic repeat request (HARQ) process, or the MAC CE requests a network device to enable or disable the at least one HARQ process. This provides a solution for dynamically controlling a HARQ function.

11 Claims, 4 Drawing Sheets

(56) References Cited

U.S. PATENT DOCUMENTS

| 2019/0246421 | A1 | 8/2019 | Zhou et al. | |
| 2019/0357300 | A1* | 11/2019 | Zhou | H04L 5/0094 |
| 2019/0379518 | A1* | 12/2019 | Yang | H04W 72/51 |
| 2020/0052832 | A1* | 2/2020 | Tian | H04L 1/1614 |
| 2020/0245395 | A1* | 7/2020 | Zhang | H04W 76/28 |
| 2020/0351026 | A1* | 11/2020 | Babaei | H04L 1/1835 |
| 2021/0006360 | A1* | 1/2021 | Asterjadhi | H04L 1/1819 |
| 2021/0152294 | A1* | 5/2021 | Xiao | H04W 72/23 |
| 2022/0045800 | A1* | 2/2022 | Chen | H04L 1/1867 |
| 2022/0046556 | A1* | 2/2022 | Lee | H04W 52/365 |
| 2022/0158770 | A1 | 5/2022 | Hong | |
| 2022/0158771 | A1* | 5/2022 | Pettersson | H04L 1/1864 |
| 2022/0278775 | A1* | 9/2022 | Huang | H04L 1/1607 |
| 2022/0286235 | A1* | 9/2022 | Ranta-Aho | H04L 1/1896 |
| 2024/0259141 | A1* | 8/2024 | Park | H04L 1/1854 |

FOREIGN PATENT DOCUMENTS

| CN | 104247469 | B | 4/2019 | |
| CN | 109963337 | A | 7/2019 | |
| CN | 110121192 | A | 8/2019 | |
| CN | 110169000 | A | 8/2019 | |
| CN | 111431671 | A | 7/2020 | |
| WO | WO-2019033072 | A1 * | 2/2019 | H04B 17/17 |

OTHER PUBLICATIONS

Huawei, HiSilicon, "Discussion on HARQ feedback enable and disable"; 3GPP TSG-RAN WG2 #106, r2-1907416; Reno, USA, May 13-17, 2019, 5 pages.
3GPP TS 38.321 V0.2.0 (Aug. 2017); "3rd Generation Partnership Project; Technical Specification Group Radio Access Network; NR;Medium Access Control (MAC) protocol specification(Release 15)", total 36 pages.
3GPP TS 38.212 V1.0.0 (Sep. 2017); "3rd Generation Partnership Project; Technical Specification Group Radio Access Network;NR;Multiplexing and channel coding(Release 15)"; total 28 pages.
Huawei et al., "Discussion on HARQ procedure in NR", 3GPP TSG-RAN WG2 Meeting #96, Reno, Nevada, US, Nov. 14-18, 2016, R2-167590, 3 pages.

* cited by examiner

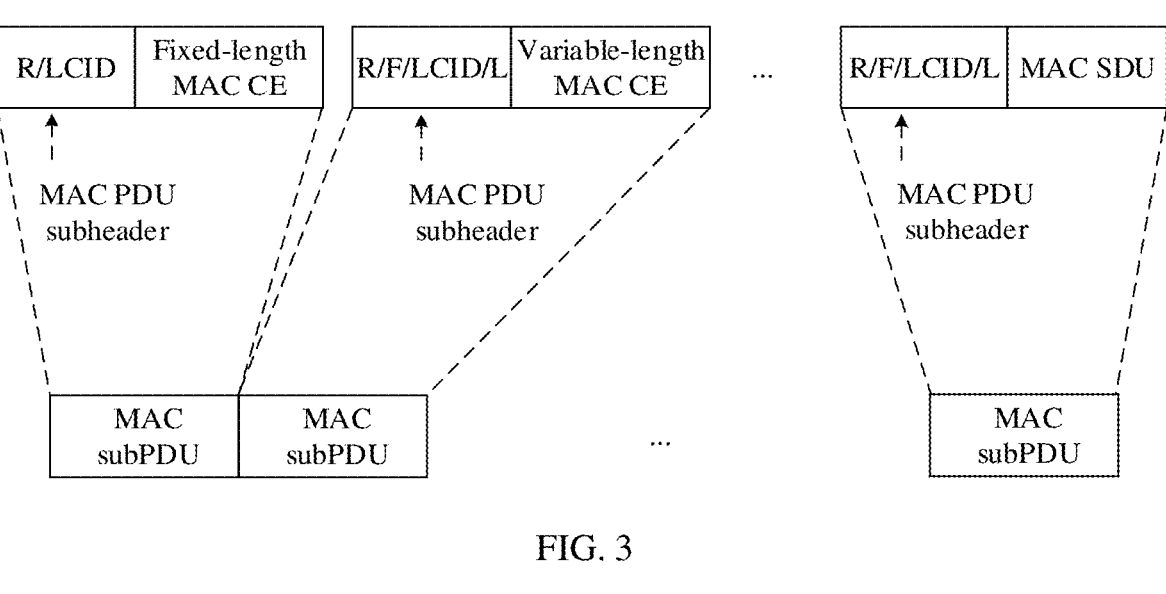

FIG. 3

```
┌──────────────┐                                    ┌───────────────┐
│Terminal device│                                   │Network device │
└──────────────┘                                    └───────────────┘
        │                                                    │
┌───────────────────────────────────────┐                   │
│ 310: Generate a MAC PDU #2, where the  │                   │
│ MAC PDU #2 includes a MAC CE #2 and    │                   │
│ the MAC CE #2 requests the network     │                   │
│ device to enable or disable at least one│                  │
│           HARQ process                  │                  │
└───────────────────────────────────────┘                   │
        │                                                    │
        │────────── 320: Send the MAC PDU #2 ──────────────▶│
        │                                                    │
```

FIG. 4

COMMUNICATION METHOD AND APPARATUS

CROSS-REFERENCE TO RELATED APPLICATIONS

This application is a continuation of International Patent Application No. PCT/CN2020/110388, filed on Aug. 21, 2020, which claims priority to Chinese Patent Application No. 201910858926.7, filed on Sep. 11, 2019. The disclosures of the aforementioned applications are hereby incorporated by reference in their entireties.

FIELD

The embodiments relate to the communication field, and to a communication method and apparatus.

BACKGROUND

A hybrid automatic repeat request (HARQ) technology is used in a long term evolution (LTE) system and a new radio (NR) system. The HARQ technology is a technology that combines forward error correction (FEC) code and an automatic repeat request (ARQ) method. FEC redundant information is added, so that a receive end can correct some errors. This can reduce a quantity of retransmission times. For an error that the FEC cannot correct, the receive end requests a transmit end to retransmit data according to an ARQ mechanism. The receive end uses error-detection codes (for example, cyclic redundancy check (CRC)) to detect whether received data is incorrect. If no error is found, the transmit end sends an ACK and continues to send new data. Otherwise, if an error is found, the transmit end sends a NACK and resends the same data.

The HARQ technology uses a stop-and-wait process to send the data. In a stop-and-wait protocol, each time the transmit end sends a data block, the transmit end stops to wait for acknowledgment information (for example, the ACK/NACK). After each transmission, the transmit end stops to wait for acknowledgment and this results in a low throughput.

Therefore, multiple stop-and-wait processes are used in the LTE and the NR: When one HARQ process is waiting for the acknowledgment information, the transmit end continues to send the data by using another HARQ process. A quantity of HARQ processes that can be used is determined based on round-trip delays (RTD) of both communication parties. A larger RTD indicates a larger quantity of HARQ processes that can be used.

The 3rd Generation Partnership Project (3GPP) standards organization has released a 5th generation (5G) mobile communication technology standard, and will study other communication technologies in the future, for example, space-ground integrated communication technology. The space-ground integrated communication technology integrates the current 5G technology and satellite communication technologies to provide global coverage. In the space-ground integrated communication technology, orbits are classified into a low earth orbit (LEO), a medium earth orbit (MEO), and a geostationary earth orbit (GEO) based on a satellite location in space.

A 3GPP research shows: a round-trip delay of LEO satellites (at 600 km altitude) is 28.408 milliseconds, a round-trip delay of MEO satellites (at 10,000 km altitude) is 190.38 milliseconds, and a round-trip delay of GEO satellites (at 35,786 km altitude) is 544.75 milliseconds. Therefore, to implement a HARQ function in a satellite scenario, a large quantity of HARQ processes, which is up to more than 500, is required.

However, currently a 3GPP protocol supports eight HARQ processes by default and supports a maximum of 16 HARQ processes. This is far different from the more than 500 HARQ processes required in the satellite scenario. In addition, with a transmission delay of more than 500 milliseconds, quick HARQ feedback almost becomes meaningless in the satellite scenario, and a retransmission task may be implemented based on an upper-layer protocol, for example, retransmission at a radio link control (RLC) layer.

In addition, there are more requirements on the HARQ function in the conventional communication technology (for example, the LTE or the NR), for example, the HARQ function needs to be enabled or disabled based on a service type. Therefore, providing a method for enabling or disabling the HARQ function is needed.

SUMMARY

A communication method may implement dynamic control on a HARQ function.

According to a first aspect, a communication method is provided, including: A terminal device (or may be a module in the terminal device, for example, a chip) generates a media access control protocol data unit MAC PDU, where the MAC PDU includes a MAC control element (CE), and the MAC CE requests a network device to enable or disable at least one hybrid automatic repeat request (HARQ) process; and sends the MAC PDU.

According to the foregoing solution, a data format of the MAC PDU is designed, so that the terminal device may request, by using the MAC CE in the MAC PDU, the network device to enable or disable the at least one HARQ process. This implements dynamic control on a HARQ function.

In a possible implementation, the MAC CE further indicates the at least one HARQ process.

According to the foregoing solution, the MAC CE in the MAC PDU is used to indicate that the terminal device requests the network device to enable or disable a HARQ process, so that the network device can enable or disable, based on the MAC CE, the HARQ process indicated by the MAC CE.

In a possible implementation, the MAC CE includes an index of the at least one HARQ process.

In a possible implementation, a logical channel identifier LCID in a header field of the MAC CE is reserved.

According to the foregoing solution, a MAC CE corresponding to the reserved LCID is used in the MAC PDU to indicate that the terminal device requests the network device to enable or disable the HARQ process, so that a current data format of the MAC PDU does not need to be changed, and compatibility with definitions in a current standard can be achieved.

In a possible implementation, the MAC CE is a fixed-length MAC CE or a variable-length MAC CE.

According to the foregoing solution, when the MAC CE is used to indicate that the terminal device requests the network device to enable or disable the HARQ process, one MAC CE may be used to indicate that the terminal device requests the network device to enable or disable one HARQ process, or one MAC CE may be used to indicate that the terminal device requests the network device to enable or disable a plurality of HARQ processes.

In a possible implementation, before the MAC PDU is generated, the method further includes: determining whether quality of a physical channel meets a preset channel quality requirement; and generating the MAC PDU when the quality of the physical channel does not meet the preset channel quality requirement.

According to the foregoing solution, whether the network device needs to be requested to enable or disable the HARQ process is determined based on whether the quality of the physical channel meets the preset channel quality requirement, so that more flexible dynamic control can be implemented on the HARQ function based on the quality of the physical channel.

According to a second aspect, a communication method is provided, including: A network device (or may be a module in a network device, for example, a chip) generates a media access control protocol data unit MAC PDU, where the MAC PDU includes a MAC control element (CE), and the MAC CE indicates a terminal device to enable or disable at least one hybrid automatic repeat request (HARQ) process; and sends the MAC PDU.

According to the foregoing solution, a data format of the MAC PDU is designed, so that the network device may indicate, by using the MAC CE in the MAC PDU, the terminal device to enable or disable the at least one HARQ process. This implements dynamic control on a HARQ function.

In a possible implementation, the MAC CE further indicates the at least one HARQ process.

According to the foregoing solution, the MAC CE in the MAC PDU is used to indicate that the terminal device needs to enable or disable a HARQ process, so that the terminal device can enable or disable, based on the MAC CE, the HARQ process indicated by the MAC CE.

In a possible implementation, the MAC CE includes an index of the at least one HARQ process.

In a possible implementation, a logical channel identifier LCID in a header field of the MAC CE is reserved.

According to the foregoing solution, a MAC CE corresponding to the reserved LCID is used in the MAC PDU to indicate that the terminal device needs to enable or disable the HARQ process, so that a current data format of the MAC PDU does not need to be changed, and compatibility with definitions in a current standard can be achieved.

In a possible implementation, the MAC CE is a fixed-length MAC CE or a variable-length MAC CE.

According to the foregoing solution, when the MAC CE is used to indicate that the terminal device needs to enable or disable the HARQ process, one MAC CE may be used to indicate that the terminal device needs to enable or disable one HARQ process, or one MAC CE may be used to indicate that the terminal device needs to enable or disable a plurality of HARQ processes.

In a possible implementation, before that a MAC PDU is generated, the method further includes: determining whether quality of a physical channel meets a preset channel quality requirement; and generating the MAC PDU when the quality of the physical channel does not meet the preset channel quality requirement.

According to the foregoing solution, whether the terminal device needs to be indicated to enable or disable the HARQ process is determined based on whether the quality of the physical channel meets the preset channel quality requirement, so that more flexible dynamic control can be implemented on the HARQ function based on the quality of the physical channel.

According to a third aspect, a communication device is provided, where the communication device may be a terminal device or network device or may be a chip in the terminal device or network device. The communication device may include a processing unit and an obtaining unit. When the communication device is the terminal device or network device, the processing unit may be a processor and the obtaining unit may be a transceiver. The terminal device or network device may further include a storage unit, where the storage unit may be a memory and is configured to store instructions. When the processing unit executes the instructions stored in the storage unit, the terminal device or network device is enabled to perform the method in the first aspect. When the communication device is the chip in the terminal device or network device, the processing unit may be the processor and the obtaining unit may be an input/output interface, a pin, a circuit, or the like. When the processing unit executes instructions stored in the storage unit, the terminal device or network device is enabled to perform the method in the first aspect. The storage unit may be a storage unit (for example, a register or a cache) in the chip, or may be a storage unit (for example, a read-only memory or a random access memory) that is in the terminal device or network device and that is outside the chip.

According to a fourth aspect, a communication device is provided, where the communication device may be a terminal device or network device or may be a chip in the terminal device or network device. The communication device may include a processing unit and a sending unit. When the communication device is the terminal device or network device, the processing unit may be a processor and the sending unit may be a transceiver. The terminal device or network device may further include a storage unit, where the storage unit may be a memory and is configured to store instructions. When the processing unit executes the instructions stored in the storage unit, the terminal device or network device is enabled to perform the method in the second aspect. When the communication device is the chip in the terminal device or network device, the processing unit may be the processor and a transceiver unit may be an input/output interface, a pin, a circuit, or the like. When the processing unit executes instructions stored in the storage unit, the terminal device or network device is enabled to perform the method in the second aspect. The storage unit may be a storage unit (for example, a register or a cache) in the chip, or may be a storage unit (for example, a read-only memory or a random access memory) that is in the terminal device or network device and that is outside the chip.

In the third aspect and the fourth aspect, that the memory is coupled to the processor may be understood as that the memory is located in the processor, or the memory is located outside the processor to be independent of the processor.

According to a fifth aspect, a computer program product is provided. The computer program product includes computer program code. When the computer program code is run on a computer, the computer is enabled to perform the method according to each of the foregoing aspects.

It should be noted that all or a part of the computer program code may be stored in a first storage medium. The first storage medium may be encapsulated with a processor or may be encapsulated separately from the processor. This is not limited in this embodiment.

According to a sixth aspect, a computer-readable medium is provided. The computer-readable medium stores program code. When the computer program code is run on a computer, the computer is enabled to perform the method according to each of the foregoing aspects.

BRIEF DESCRIPTION OF DRAWINGS

FIG. 3 is a schematic diagram depicting a data format of a MAC PDU;

FIG. 4 is another schematic interaction diagram of a communication method;

DETAILED DESCRIPTION OF THE EMBODIMENTS

The following describes solutions with reference to accompanying drawings.

The solutions in these embodiments may be applied to various communication systems, for example, a long term evolution (LTE) system, an LTE frequency division duplex (FDD) system, LTE time division duplex (TDD), new radio (NR) in a 5th generation (5G) mobile communication system, a future mobile communication system, and the like.

Figures 1, 2:
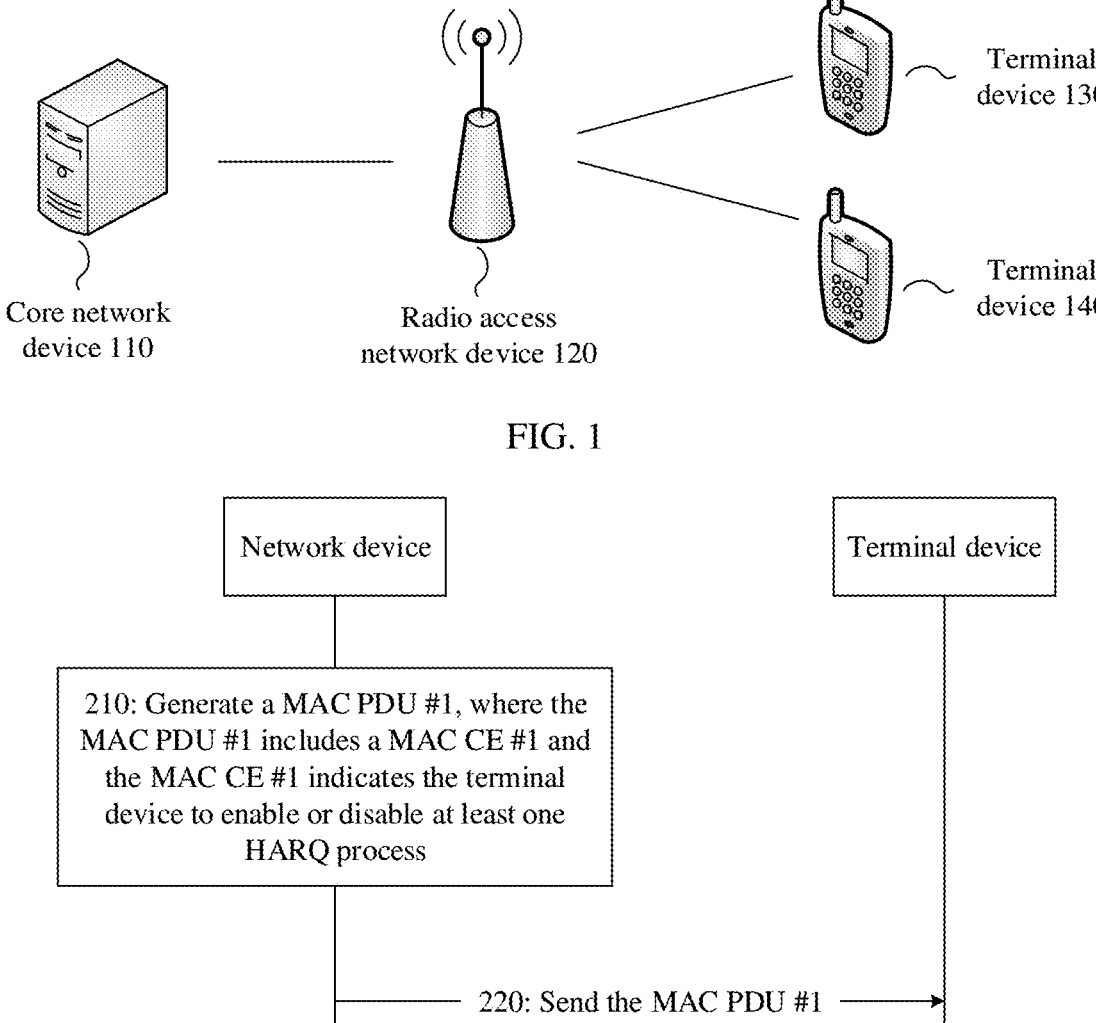
FIG. 1 is a schematic diagram depicting an architecture of a mobile communication system applicable to an embodiment.
FIG. 2 is a schematic interaction diagram of a communication method.

FIG. 1 is a schematic diagram depicting an architecture of a mobile communication system applicable to an embodiment. As shown in FIG. 1, the mobile communication system includes a core network device 110, a radio access network device 120, and at least one terminal device (for example, a terminal device 130 and a terminal device 140 in FIG. 1). A terminal device is connected to a radio access network device 120 in a wireless manner, and the radio access network device 120 is connected to a core network device 110 in the wireless or a wired manner. The core network device 110 and the radio access network device 120 may be independent and different physical devices, or a function of the core network device 110 and a logical function of the radio access network device 120 may be integrated into the same physical device, or some functions of the core network device 110 and some functions of the radio access network device 120 may be integrated into one physical device. The terminal device may be at a fixed location or may be mobile. FIG. 1 is merely the schematic diagram. The communication system may further include another network device, for example, may further include a wireless relay device and a wireless backhaul device, which are not shown in FIG. 1. A quantity of core network devices, a quantity of radio access network devices, and a quantity of terminal devices included in the mobile communication system are not limited in the embodiments.

The radio access network device 120 in the embodiments is an access device used by the terminal device to access the mobile communication system in a wireless manner. The radio access network device 120 may be a base station NodeB, an evolved NodeB (eNodeB), a transmission reception point (TRP), a next-generation NodeB (gNB) in the 5G mobile communication system, a base station in a future mobile communication system, or an access node in a WiFi system; may be a cloud radio controller in a cloud radio access network (CRAN) scenario; or may be a relay station, a vehicle-mounted device, a wearable device, a network device in a future evolved PLMN network, or the like. A technology and a device that are used by the radio access network device 120 are not limited in the embodiments. In the embodiments, the radio access network device 120 is referred to as a network device for short. Unless otherwise specified, all network devices may be radio access network devices.

The terminal device in the embodiments may also be referred to as a terminal, user equipment (UE), a mobile station (MS), a mobile terminal (MT), and the like. The terminal device may be a mobile phone, a tablet computer, a computer with a wireless transceiver function, a virtual reality (VR) terminal device, an augmented reality (AR) terminal device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home, and the like. A specific technology and a specific device form that are used by the terminal device are not limited in the embodiments.

The network device and the terminal device may be deployed on land, including an indoor device, an outdoor device, a hand-held device, or the vehicle-mounted device; may be deployed on water; or may be deployed on an airplane, a balloon, and a satellite in the air. Application scenarios of the network device and the terminal device are not limited in the embodiments \.

The network device and the terminal device may communicate with each other by using a licensed spectrum, an unlicensed spectrum, or by using both the licensed spectrum and the unlicensed spectrum. The network device and the terminal device may communicate with each other by using a spectrum below 6 gigahertz (GHz) a spectrum above 6 GHz, or by using both the spectrum below 6 GHz and the spectrum above 6 GHz. A spectrum resource used between the network device and the terminal device is not limited in the embodiments.

The 3GPP standards organization has released a 5G mobile communication technology standard, and will study other communication technologies in future, for example, space-ground integrated communication technology. The space-ground integrated communication technology integrates the current 5G standard and satellite communication technologies to provide global coverage. In the space-ground integrated communication technology, orbits are classified into LEO orbits, MEO orbits, and GEO orbits based on a satellite location in space.

A 3GPP research shows: a round-trip delay of LEO satellites (at 600 km altitude) is 28.408 milliseconds, a round-trip delay of MEO satellites (at 10,000 km altitude) is 190.38 milliseconds, and a round-trip delay of GEO satellites (at 35,786 km altitude) is 544.75 milliseconds. Therefore, to implement a HARQ function in a satellite scenario, a large quantity of HARQ processes, which is up to more than 500, is required.

However, currently a 3GPP protocol supports eight HARQ processes by default and supports a maximum of 16 HARQ processes. This is far different from the more than 500 HARQ processes required in the satellite scenario. In addition, with a transmission delay of more than 500 milliseconds, quick HARQ feedback almost becomes meaningless in the satellite scenario, and a retransmission task may be implemented based on an upper-layer protocol, for example, retransmission at an RLC layer.

In addition, there are more requirements on the HARQ function in the conventional communication technology (for example, the LTE or the NR), for example, the HARQ function needs to be enabled or disabled based on a service type. Therefore, providing a method for enabling or disabling the HARQ function is needed.

In a known solution, when a terminal device establishes a transmission channel with a network device, a radio resource control (RRC) message is used to indicate, to the terminal device, that a link does not support the HARQ function, and no HARQ function is enabled in subsequent data transmission on the link. If the solution needs to be changed, RRC signaling needs to be sent again for a link update.

It is inflexible to enable or disable the HARQ function on the link by using the RRC message. The RRC message is generally sent when the link is set up and released, or a service configuration changes. Therefore, enabling or disabling the HARQ function cannot be flexibly configured based on a link status.

Therefore, a communication method may implement dynamic control on the HARQ function.

The following describes in detail the communication method provided in this embodiment with reference to FIG. 2 to FIG. 4.

FIG. 2 is a schematic interaction diagram of a communication method 200 according to this embodiment. Each step of the method 200 is described in detail below.

In this embodiment, the method 200 is described by using an example in which the method 200 is performed by a terminal device and a network device. By way of example and not limitation, the method 200 may alternatively be performed by a chip corresponding to the terminal device and a chip corresponding to the network device.

Step 210: The network device generates a media access control (MAC) protocol data unit PDU) #1 (that is, an example of a MAC PDU), where the MAC PDU #1 includes a MAC control element (CE) #1 (that is, an example of a MAC CE) and the MAC CE #1 indicates the terminal device to enable or disable at least one HARQ process.

FIG. 3 shows a data format of a MAC PDU #1. One MAC PDU #1 includes one or more MAC PDU subheaders and one or more MAC sub PDUs. A MAC subPDU may be a MAC CE or a MAC service data unit (SDU).

The MAC CE #1 may be a variable-length or a fixed-length MAC CE. A MAC PDU subheader corresponding to the fixed-length MAC CE (that is, an example of a header field of the MAC CE) includes a Reserved® field and a logical channel identifier (LCID) field. A MAC PDU subheader corresponding to the variable-length MAC CE includes the reserved field, an F field, and the LCID field and an L field, where the F field indicates a length of the L field, and the L field indicates a length of the MAC CE.

A value of the LCID and a meaning of the value of the LCID may be shown in Table 1 (for details, refer to 3GPP TS 38.321 V15.3.0 Table 6.2.1-1).

TABLE 1

| Value | Meaning | Description |
|-------|---------|-------------|
| 0 | CCCH | Common control channel |
| 1-32 | LCID | Logical channel identifier |
| 33-46 | Reserved | Reserved |
| 47 | Recommended bit rate | Recommended bit rate |
| . . . | . . . | . . . |
| 63 | Padding | Padding |

The CCCH indicates the common control channel (CCCH).

The MAC CE #1 may be a MAC CE included in the MAC PDU #1, and the MAC CE #1 indicates the terminal device to enable or disable at least one HARQ process. For example, an identifier may be added to the MAC CE #1, and the identifier indicates the terminal device to enable or disable at least one HARQ process on a link. The identifier is referred to as a HARQ enabling indication below.

For example, the HARQ enabling indication may be represented by several bits. For example, when a value of the HARQ enabling indication "s" "0", it indicates that the terminal device is indicated to disable all HARQ processes on the link. When the value of the HARQ enabling indication "s" "1", it indicates that the terminal device is indicated to enable all the HARQ processes on the link.

For example, when the value of the HARQ enabling indication "s""00", it indicates that the terminal device is indicated to disable a HARQ process that is first enabled on the link. When the value of the HARQ enabling indication "s""01", it indicates that the terminal device is indicated to enable a HARQ process that is first disabled on the link.

Step 220: Send the MAC PDU #1. Correspondingly, the terminal device receives the MAC PDU #1 from the network device.

The terminal device receives the MAC PDU #1 and determines to enable or disable the at least one HARQ process based on the MAC CE #1 included in the MAC PDU #1.

In an implementation, the MAC CE #1 may further indicate at least one HARQ process that needs to be enabled or disabled.

For example, the network device may pre-configure an association relationship between the HARQ enabling indication and a HARQ process. For example, when the value of the HARQ enabling indication "s""00", it indicates that the terminal device is indicated to disable a HARQ process #5 on the link. When the value of the HARQ enabling indication "s""11", it indicates that the terminal device is indicated to enable the HARQ process #5 on the link.

For example, when the value of the HARQ enabling indication "s""01", it indicates that the terminal device is indicated to disable a HARQ process #1 and a HARQ process #3 on the link. When the value of the HARQ enabling indication "s""10", it indicates that the terminal device is indicated to enable the HARQ process #1 and the HARQ process #3 on the link.

In an implementation, the MAC CE #1 may further include an index of the at least one HARQ process that needs to be enabled or disabled.

In other words, the MAC CE #1 may include not only a HARQ enabling indication that indicates to enable or disable the HARQ process, but also an index of a HARQ process that needs to be enabled or disabled.

For example, formats of the MAC CE #1 and a MAC PDU subheader corresponding to the MAC CE #1 may be shown in Table 2. The HARQ enabling indication included in the MAC CE #1 may be indicated by using one bit, and a HARQ process index corresponding to the HARQ enabling indication may be indicated by using seven bits. The HARQ enabling indication and the HARQ process index are content included in the MAC CE #1. For example, when the value of the HARQ enabling indication "s" "0", it indicates that the terminal device is indicated to disable a HARQ process indicated by the index. When the value of the HARQ enabling indication "s" "1", it indicates that the terminal device is indicated to enable the HARQ process indicated by the index.

TABLE 2

| R | LCID | HARQ enabling indication | HARQ process index |
|---|------|--------------------------|--------------------|

In an implementation, the LCID in Table 2 may be reserved. The value of the LCID may be the reserved value in Table 1, in other words, the MAC CE #1 is a newly added MAC CE in the MAC PDU #1. The value of the LCID may be any one of 33 to 46. For example, when the value of the LCID is 46, it may indicate that the MAC CE #1 is used to indicate a HARQ process that needs to be enabled or disabled.

The MAC CE #1 in Table 2 may be a fixed-length MAC CE. The variable-length MAC CE may further indicate the HARQ process that needs to be enabled or disabled.

For example, a length of the MAC CE #1 is indicated by the L field. When the L field indicates that the length of the MAC CE #1 is n bytes, n is an integer greater than or equal to 1. It is assumed that one byte is used to indicate two HARQ processes that need to be enabled or disabled, in other words, one HARQ process needs four bits to indicate that the HARQ process is enabled or disabled. For example, two bits are used to represent the HARQ enabling indication and two bits are used to represent the HARQ process index, so that the MAC CE #1 may indicate 2×n HARQ processes that need to be enabled or disabled.

For example, the formats of the MAC CE #1 and the MAC PDU subheader corresponding to the MAC CE #1 may be shown in Table 3. The L field indicates that the length of the MAC CE #1 is five bytes. It is assumed that one HARQ process that needs to be enabled or disabled is indicated by using one byte. For example, one bit is used to represent the HARQ enabling indication and seven bits are used to represent the HARQ process index, so that the MAC CE #1 may indicate five HARQ processes that need to be enabled or disabled.

TABLE 3

| R | LCID | HARQ enabling indication #1 | HARQ process index #1 | . . . | HARQ enabling indication #5 | HARQ process index #5 |
|---|------|-----------------------------|-----------------------|-------|-----------------------------|-----------------------|

The HARQ enabling indication #1 to the HARQ process index #5 are content included in the MAC CE #1. The HARQ enabling indication #1 indicates the terminal device to enable or disable a HARQ process indicated by the HARQ process index #1. The HARQ enabling indication #5 indicates the terminal device to enable or disable a HARQ process indicated by the HARQ process index #5.

It should be understood that the foregoing HARQ enabling indications and the HARQ process indication manners are merely examples for description. Any other method for indicating, by using a MAC CE in the MAC PDU, the HARQ process that needs to be enabled or disabled falls within the protection scope.

In an implementation, the method 200 may further include: before generating the MAC PDU #1, the network device may determine whether quality of a physical channel meets a preset channel quality requirement. When the quality of the physical channel does not meet the preset channel quality requirement, the network device generates the MAC PDU #1.

In other words, the network device may determine, based on the quality of the physical channel, whether the HARQ process needs to be enabled or disabled. For example, the network device may determine, based on whether the quality of the physical channel meets the preset channel quality requirement, whether the HARQ process needs to be enabled or disabled. When the quality of the physical channel does not meet the preset channel quality requirement, the network device may generate the MAC PDU #1, to indicate the terminal device to disable some HARQ processes on the link. When the quality of the physical channel meets the preset channel quality requirement, the network device may generate the MAC PDU #1, to indicate the terminal device to enable some HARQ processes on the link.

It should be understood that the foregoing is merely an example for description. For example, the network device may further determine, based on a service type, whether the HARQ process needs to be enabled or disabled.

The communication method provided in the embodiments is described in detail with reference to the method 200. The method may be applied to downlink transmission. The following describes in detail a communication method applied to uplink transmission.

FIG. 4 is a schematic interaction diagram of a communication method 300. Each step of the method 300 is described in detail below.

In this embodiment, the method 300 is described by using an example in which the method 300 is performed by a terminal device and a network device. By way of example and not limitation, the method 300 may alternatively be performed by a chip corresponding to the terminal device and a chip corresponding to the network device.

Step 310: The terminal device generates a MAC PDU #2 (that is, another example of a MAC PDU), where the MAC PDU #2 includes a MAC CE #2 (that is, another example of a MAC CE), and the MAC CE #2 requests the network device to enable or disable at least one HARQ process.

It should be noted that, for a data format of the MAC PDU #2, refer to FIG. 3 and related descriptions. For brevity, details are not described herein again.

A value of an LCID corresponding to the MAC PDU #2 and a meaning indicated by the value of the LCID may be shown in Table 4 (for details, refer to 3GPP TS 38.321 V15.3.0 Table 6.2.1-2).

TABLE 4

| Value | Meaning | Description |
|-------|---------|-------------|
| 0 | CCCH of size 64 bits | Common control channel (64 bits) |
| 1-32 | LCID | Logical channel identifier |
| 33-51 | Reserved | Reserved |
| 52 | CCCH of size 48 bits | Common control channel (48 bits) |
| . . . | . . . | . . . |
| 63 | Padding | Padding |

The MAC CE #2 may be a MAC CE included in the MAC PDU #2, and the MAC CE #2 requests the network device to enable or disable the at least one HARQ process. For example, an identifier may be added to the MAC CE #2, and the identifier requests the network device to enable or disable at least one HARQ process on a link. The identifier is referred to as a HARQ enabling indication below.

For example, the HARQ enabling indication may be represented by several bits. For example, when a value of the HARQ enabling indication "s" "0", it indicates that the network device is requested to disable all HARQ processes on the link. When the value of the HARQ enabling indication "s" "1", it indicates that the network device is requested to enable all HARQ processes on the link. The identifier is referred to as the HARQ enabling indication below.

For example, when the value of the HARQ enabling indication "s""00", it indicates that the network device is requested to disable a HARQ process that is first enabled on the link. When the value of the HARQ enabling indication "s""01", it indicates that the network device is requested to enable a HARQ process that is first disabled on the link.

Step 320: The terminal device sends the MAC PDU #2. Correspondingly, the network device receives the MAC PDU #2 from the terminal device.

The network device receives the MAC PDU #2 and determines to enable or disable the at least one HARQ process based on the MAC CE #2 included in the MAC PDU #2.

In an implementation, the MAC CE #2 may further indicate at least one HARQ process that needs to be enabled or disabled.

For example, the network device may pre-configure an association relationship between the HARQ enabling indication and a HARQ process. For example, when the value of the HARQ enabling indication "s"00", it indicates that the network device is requested to disable a HARQ process #5 on the link. When the value of the HARQ enabling indication "s"11", it indicates that the network device is requested to enable the HARQ process #5 on the link.

For example, when the value of the HARQ enabling indication "s"01", it indicates that the network device is requested to disable a HARQ process #1 and a HARQ process #3 on the link. When the value of the HARQ enabling indication "s"10", it indicates that the network device is requested to enable the HARQ process #1 and the HARQ process #3 on the link.

In an implementation, the MAC CE #2 may further include an index of the at least one HARQ process that needs to be enabled or disabled.

In other words, the MAC CE #2 may include not only a HARQ enabling indication that indicates to enable or disable the HARQ process, but also an index of a HARQ process that needs to be enabled or disabled.

For example, formats of the MAC CE #2 and a MAC PDU subheader corresponding to the MAC CE #2 may be shown in Table 5. A HARQ enabling indication included in the MAC CE #2 may be indicated by using one bit, and a HARQ process index corresponding to the HARQ enabling indication may be indicated by using seven bits. The HARQ enabling indication and the HARQ process index are content included in the MAC CE #2. For example, when the value of the HARQ enabling indication "s" "0", it indicates that the network device is requested to disable a HARQ process indicated by the index. When the value of the HARQ enabling indication "s" "1", it indicates that the network device is requested to enable the HARQ process indicated by the index.

TABLE 5

| R | LCID | HARQ enabling indication | HARQ process index |
|---|------|--------------------------|--------------------|

In an implementation, the LCID in Table 5 may be reserved. The value of the LCID may be the reserved value in Table 4, in other words, the MAC CE #2 is a newly added MAC CE in the MAC PDU #2. The value of the LCID may be any one of 33 to 51. For example, when the value of the LCID is 51, it may indicate that the MAC CE #2 is used to request the network device to enable or disable the HARQ process indicated by the HARQ process index.

The MAC CE #2 in Table 5 may be a fixed-length MAC CE. A variable-length MAC CE may further indicate the HARQ process that needs to be enabled or disabled.

For example, a length of the MAC CE #2 is indicated by an L field. When the L field indicates that the length of the MAC CE #2 is m bytes, m is an integer greater than or equal to 1. It is assumed that one byte is used to indicate four HARQ processes that need to be enabled or disabled, in other words, one HARQ process needs two bits to indicate that the HARQ process is enabled or disabled. For example, one bit is used to represent the HARQ enabling indication and one bit is used to represent the HARQ process index, so that the MAC CE may indicate 4×m HARQ processes that need to be enabled or disabled.

For example, the formats of the MAC CE #2 and the MAC PDU subheader corresponding to the MAC CE #2 may be shown in Table 6. The L field indicates that the length of the MAC CE #2 is four bytes. It is assumed that one HARQ process that needs to be enabled or disabled is indicated by using one byte. For example, one bit is used to represent the HARQ enabling indication and seven bits are used to represent the HARQ process index, so that the MAC CE #2 may indicate four HARQ processes that need to be enabled or disabled.

TABLE 6

| R | LCID | HARQ enabling indication #1 | HARQ process index #1 | . . . | HARQ enabling indication #4 | HARQ process index #4 |
|---|------|------------------------------|------------------------|-------|------------------------------|------------------------|

The HARQ enabling indication #1 to a HARQ process index #4 are content included in the MAC CE #2. The HARQ enabling indication #1 indicates the terminal device to enable or disable a HARQ process indicated by the HARQ process index #1. The HARQ enabling indication #4 indicates the terminal device to enable or disable a HARQ process indicated by the HARQ process index #4.

It should be understood that the foregoing HARQ enabling indications and the HARQ process indication manners are merely examples for description. Any other method for indicating, by using a MAC CE in the MAC PDU, the HARQ process that needs to be enabled or disabled falls within a protection scope.

In an implementation, the method 300 may further include: before the terminal device generates the MAC PDU #2, the terminal device may determine whether quality of a physical channel meets a preset channel quality requirement. When the quality of the physical channel does not meet the preset channel quality requirement, the terminal device generates the MAC PDU #2.

In other words, the terminal device may determine, based on the quality of the physical channel, whether to request the network device to enable or disable the HARQ process. For example, the terminal device may determine, based on whether the quality of the physical channel meets the preset channel quality requirement, whether to request the network device to enable or disable the HARQ process. When the quality of the physical channel does not meet the preset channel quality requirement, the terminal device may generate a MAC PDU #1, to request the network device to disable some HARQ processes on the link. When the quality of the physical channel meets the preset channel quality requirement, the terminal device may generate the MAC PDU #1, to request the network device to enable some HARQ processes on the link.

It should be understood that the foregoing is merely an example for description. For example, the terminal device may further determine, based on a service type, whether to request the network device to enable or disable the HARQ process.

The methods are described in detail above with reference to FIG. 1 to FIG. 4, and apparatuses are described in detail below with reference to FIG. 5 to FIG. 8. It should be noted that the apparatuses shown in FIG. 5 to FIG. 8 may implement the steps in the foregoing methods. For brevity, details are not described herein again.

Figure 5:
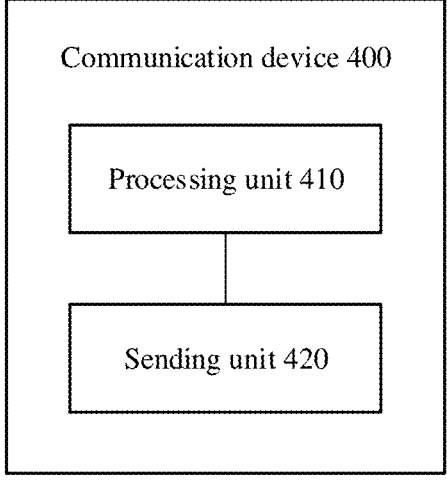
FIG. 5 is a schematic diagram of a communication device.

FIG. 5 is a schematic diagram of a communication device. A communication device 400 shown in FIG. 5 includes a processing unit 410 and a sending unit 420. Optionally, the communication device 400 may be the foregoing terminal device, the processing unit 410 may perform, for example, step 310, and the sending unit 420 may perform, for example, step 320.

The processing unit 410 is configured to generate a media access control protocol data unit MAC PDU, where the MAC PDU includes a MAC control element (CE), and the MAC CE requests a network device to enable or disable at least one hybrid automatic repeat request (HARQ) process.

The sending unit 420 is configured to send the MAC PDU.

Optionally, in a possible implementation, the MAC CE further indicates the at least one HARQ process.

Optionally, in a possible implementation, the MAC CE includes an index of the at least one HARQ process.

Optionally, in a possible implementation, a logical channel identifier LCID in a header field of the MAC CE is reserved.

Optionally, in a possible implementation, the MAC CE is a fixed-length MAC CE or a variable-length MAC CE.

Optionally, in a possible implementation, the processing unit 410 is further configured to: before generating the MAC PDU, determine whether quality of a physical channel meets a preset channel quality requirement.

The processing unit 410 is further configured to: generate the MAC PDU when the quality of the physical channel does not meet the preset channel quality requirement.

Figure 6:
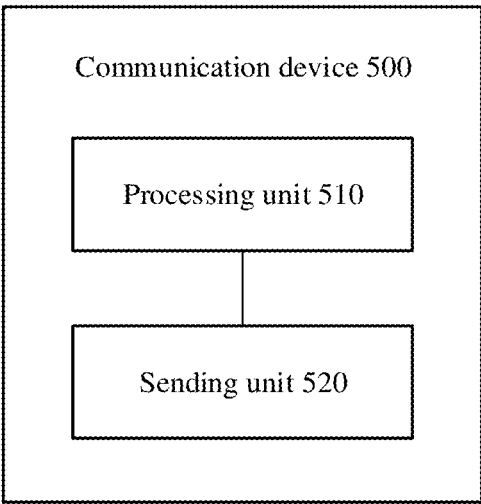
FIG. 6 is a schematic diagram of another communication device.

FIG. 6 is a schematic diagram of another communication device. The communication device 500 shown in FIG. 6 includes a processing unit 510 and a sending unit 520. Optionally, the communication device 500 may be the foregoing network device, the processing unit 510 may perform, for example, step 210, and the sending unit 520 may perform, for example, step 220.

The processing unit 510 is configured to generate a media access control protocol data unit MAC PDU, where the MAC PDU includes a MAC control element (CE), and the MAC CE indicates a terminal device to enable or disable at least one hybrid automatic repeat request (HARQ) process.

The sending unit 520 is configured to send the MAC PDU.

Optionally, in a possible implementation, the MAC CE further indicates the at least one HARQ process.

Optionally, in a possible implementation, the MAC CE includes an index of the at least one HARQ process.

Optionally, in a possible implementation, a logical channel identifier LCID in a header field of the MAC CE is reserved.

Optionally, in a possible implementation, the MAC CE is a fixed-length MAC CE or a variable-length MAC CE.

Optionally, in a possible implementation, the processing unit 510 is further configured to: before generating the MAC PDU, determine whether quality of a physical channel meets a preset channel quality requirement.

The processing unit 510 is further configured to: generate the MAC PDU when the quality of the physical channel does not meet the preset channel quality requirement.

Figure 7:
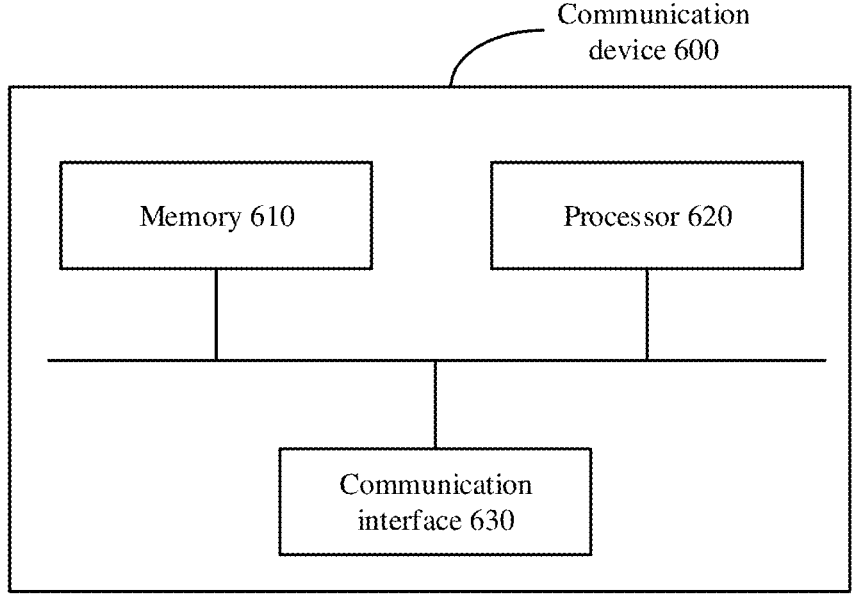
FIG. 7 is a schematic block diagram of still another communication device.

In an optional embodiment, the processing unit 410 may be a processor 620, the sending unit 420 may be a communication interface 630, and a communication device may further include a memory 610, as shown in FIG. 7.

In an optional embodiment, the processing unit 510 may be the processor 620, the sending unit 520 may be the communication interface 630, and the communication device may further include the memory 610, as shown in FIG. 7.

FIG. 7 is a schematic block diagram of still another communication device. A communication device 600 shown in FIG. 7 may include a memory 610, a processor 620, and a communication interface 630. The memory 610, the processor 620, and the communication interface 630 are connected by using an internal connection path. The memory 610 is configured to store instructions. The processor 620 is configured to execute the instructions stored in the memory 610, to control the communication interface 630 to receive/send a MAC PDU. Optionally, the memory 610 may be coupled to the processor 620 through an interface or may be integrated with the processor 620.

It should be noted that the communication interface 630 uses a transceiver apparatus such as but not limited to a transceiver to implement communication between the communication device 600 and another device or a communication network. The communication interface 630 may further include an input/output interface.

In an implementation process, steps in the foregoing methods can be implemented by using a hardware integrated logic circuit in the processor 620, or by using instructions in a form of software. The method disclosed with reference to the embodiments may be directly performed by a hardware processor or may be performed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory 610. The processor 620 reads information in the memory 610 and completes the steps of the foregoing method in combination with hardware of the processor 620. To avoid repetition, details are not described herein.

the processor in the embodiments may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor, or the like.

It should also be understood that in the embodiments, a memory may include a read-only memory and a random access memory and provide instructions and data for the processor. A part of the processor may further include a non-volatile random access memory. For example, the processor may further store information of a device type.

Figure 8:
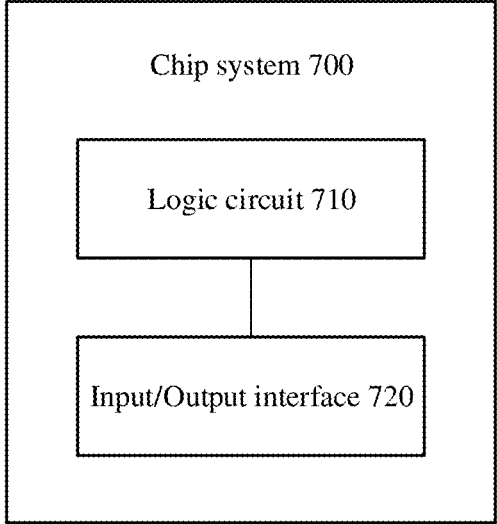
FIG. 8 is a schematic diagram of a chip system.

FIG. 8 is a schematic diagram of a chip system according to an embodiment of. A chip system 700 shown in FIG. 8 includes a logic circuit 710 and an input/output interface 720. The logic circuit is configured to be coupled to the input interface and transmit data (for example, a MAC PDU) through the input/output interface to perform the methods described in FIG. 2 and FIG. 4.

It should be understood that in the embodiments, "B corresponding to A" indicates that B is associated with A, and B may be determined according to A. However, it should further be understood that determining A according to B does not mean that B is determined according to A only; that is, B may also be determined according to A and/or other information.

It should be understood that the term "and/or" describes only an association relationship for describing associated objects and represents that three relationships may exist. For example, A and/or B may represent the following three cases: Only A exists, both A and B exist, and only B exists. In addition, the character "/" usually indicates an "or" relationship between the associated objects.

It should be understood that sequence numbers of the foregoing processes do not mean execution orders in various embodiments. The execution orders of the processes should be determined based on functions and internal logic of the processes and should not be construed as any limitation on the implementation processes of the embodiments. A person of ordinary skill in the art may be aware that units and algorithm steps in the examples described with reference to the embodiments can be implemented by electronic hardware or a combination of computer software and electronic hardware. Whether the functions are performed by hardware or software depends on constraint conditions of the solutions. A person skilled in the art may use different methods to implement the described functions, but it should not be considered that the implementation goes beyond the scope.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on an actual requirement to achieve the objectives of the solutions of the embodiments.

In addition, function units in the embodiments may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the solutions may be implemented in a form of a software product.

The computer software product is stored in a storage medium and includes several instructions for instructing a computer device (which may be a personal computer, a server, or a network device) to perform all or some of the steps of the methods described in the embodiments. The foregoing storage medium includes various media that can store program code, for example, a USB flash drive, a removable hard disk, a read-only memory (ROM), a random access memory (RAM), a magnetic disk, and an optical disc.

The foregoing descriptions are merely specific implementations, but are not intended to limit the protection scope. Any variation or replacement readily figured out by a person skilled in the art within the scope shall fall within the scope of the embodiments.

What is claimed is:

1. A method comprising:
determining whether a quality of a physical channel meets a preset channel quality requirement;
generating a media access control protocol data unit (MAC PDU), wherein the MAC PDU comprises a MAC control element (CE), and the MAC CE requests a network device to enable at least one hybrid automatic repeat request (HARQ) process of a plurality of HARQ processes when the quality of the physical channel meets the preset channel quality requirement, or to disable at least one HARQ process of the plurality of HARQ processes when the quality of the physical channel does not meet the preset channel quality requirement, the enabling and disabling indicated by the MAC CE comprising one bit of a HARQ enabling indication and seven bits of a HARQ process index and a logical channel identifier (LCID) in a header field of the MAC CE being a reserved value that identifies a newly added MAC CE; and
sending the MAC PDU.

2. The method according to claim 1, wherein the MAC CE further indicates the at least one HARQ process.

3. The method according to claim 1, wherein the MAC CE is a fixed-length MAC CE or a variable-length MAC CE.

4. A communication device, comprising:
at least one processor, the at least one processor is coupled to a non-transitory memory;
wherein when reading and executing program code stored in the non-transitory memory, the at least one processor is configured to:
determine whether a quality of a physical channel meets a preset channel quality requirement;
generate a media access control protocol data unit (MAC PDU), wherein the MAC PDU comprises a MAC control element (CE), and the MAC CE requests a network device to enable at least one hybrid automatic repeat request (HARQ) process of a plurality of HARQ processes when the quality of the physical channel meets the preset channel quality requirement, or to disable at least one HARQ process of the plurality of HARQ processes when the quality of the physical channel does not meet the preset channel quality requirement, wherein the enabling and disabling indicated by the MAC CE comprises one bit of a HARQ enabling indication and seven bits of a HARQ process index and a logical channel identifier (LCID) in a header field of the MAC CE being a reserved value that identifies a newly added MAC CE; and
send the MAC PDU.

5. The communication device according to claim 4, further comprising the non-transitory memory.

6. The communication device according to claim 4, wherein the MAC CE further indicates the at least one HARQ process.

7. The communication device according to claim 4, wherein the MAC CE is a fixed-length MAC CE or a variable-length MAC CE.

8. A communication device, comprising:

at least one processor, the at least one processor is coupled to a non-transitory memory;

wherein when reading and executing program code stored in the non-transitory memory, the at least one processor is configured to:

determine whether a quality of a physical channel meets a preset channel quality requirement;

generate a media access control protocol data unit (MAC PDU), wherein the MAC PDU comprises a MAC control element (CE), and the MAC CE requests a network device to enable at least one hybrid automatic repeat request (HARQ) process of a plurality of HARQ processes when the quality of the physical channel meets the preset channel quality requirement, or to disable at least one HARQ process of the plurality of HARQ processes when the quality of the physical channel does not meet the preset channel quality requirement, wherein the enabling and disabling indicated by the MAC CE comprises one bit of a HARQ enabling indication and seven bits of a HARQ process index and a logical channel identifier (LCID) in a header field of the MAC CE being a reserved value that identifies a newly added MAC CE; and send the MAC PDU.

9. The communication device according to claim 8, further comprising the non-transitory memory.

10. The communication device according to claim 8, wherein the MAC CE further indicates the at least one HARQ process.

11. The communication device according to claim 8, wherein the MAC CE is a fixed-length MAC CE or a variable-length MAC CE.

\* \* \* \* \*